(12) United States Patent
Gagliano et al.

(10) Patent No.: US 9,088,415 B2
(45) Date of Patent: Jul. 21, 2015

(54) AUTHENTICATION OF CACHE DNS SERVER RESPONSES

(75) Inventors: Roque Gagliano, Pully (CH); Stig I. Venaas, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 13/197,274

(22) Filed: Aug. 3, 2011

(65) Prior Publication Data

US 2013/0036307 A1    Feb. 7, 2013

(51) Int. Cl.
*H04L 9/32* (2006.01)
*H04L 29/06* (2006.01)
*H04L 29/12* (2006.01)

(52) U.S. Cl.
CPC .............. *H04L 9/321* (2013.01); *H04L 9/3265* (2013.01); *H04L 61/1511* (2013.01); *H04L 61/6009* (2013.01); *H04L 63/0823* (2013.01); *H04L 63/126* (2013.01)

(58) Field of Classification Search
USPC ........................................................ 713/171
See application file for complete search history.

(56) References Cited

U.S. PATENT DOCUMENTS

2006/0047786 A1* 3/2006 Doi ............................... 709/220
2010/0031044 A1* 2/2010 Haddad et al. ................ 713/171
2012/0054497 A1* 3/2012 Korhonen ..................... 713/179

OTHER PUBLICATIONS

Hoffman, Paul. "Wrapping Last-Hop DNS for Traffic Protection" (2010).*

Chandramouli, Ramaswamy, and Scott Rose. "Challenges in securing the domain name system" Security & Privacy, IEEE 4.1 (2006): 84-87.*
Chandramouli, Ramaswamy, and Scott Rose. "Open issues in secure DNS deployment." Security & Privacy, IEEE 7.5 (2009): 29-35.*
P. Vixie et al., "RFC 2136: Dynamic Updates in the Domain Name System (DNS Update)," pp. 1-26, Apr. 1997.
D. Eastlake, "RFC 2137: Secure Domain Name System Dynamic Update," pp. 1-11, Apr. 1997.
Silvano Gai, *Internetworking IPv6 with Cisco Routers*, "Chapter 4: IPv6 Addresses," pp. 57-82, 1997-1998.
Silvano Gai, *Internetworking IPv6 with Cisco Routers*, "Chapter 6: Neighbor Discovery," pp. 103-123, 1997-1998.
T. Narten et al., "RFC 2461: Neighbor Discovery for IP Version 6 (IPv6)," pp. 1-93, Dec. 1998.
D. Eastlake, "RFC 2535: Domain Name System Security Extensions," pp. 1-47, Mar. 1999.
P. Vixie et al., "RFC 2845: Secret Key Transaction Authentication for DNS (TSIG)," pp. 1-15, May 2000.
D. Eastlake, "RFC 2931: DNS Request and Transaction Signatures (SIG (0)s)," pp. 1-10, Sep. 2000.

(Continued)

*Primary Examiner* — Vikkram Bali
*Assistant Examiner* — Tracy Mangialaschi
(74) *Attorney, Agent, or Firm* — Campbell Stephenson LLP (57) ABSTRACT

A response to a Domain Name System (DNS) query can be protected with authentication information to be used by a host that originated the query. In one example, a DNS server is not among servers that can be authenticated by the Domain Name System Security Extensions (DNSSEC). The DNS server generates a public-private key pair and uses the private key for signing DNS resolutions. The corresponding public key can be distributed to hosts that will communicate with the DNS server. In various implementations, the public key is distributed by the DNS server and/or routers or as part of a neighbor discovery interaction. In one example, the public key is distributed in certificate path advertisements of the IPv6 Secure Neighbor Discovery Protocol (SEND) protocol.

19 Claims, 4 Drawing Sheets

(56) References Cited

OTHER PUBLICATIONS

D. Eastlake, "RFC 2930: Secret Key Establishment for DNS (TKEY RR)," pp. 1-16, Sep. 2000.
B. Wellington, "RFC 3007: Secure Domain Name System (DNS) Dynamic Update," pp. 1-9, Nov. 2000.
J. Raftery, "Securing your DNS Information with Transaction Signatures (TSIG)," 3 pages, 2001.
S. Kwan et al., "RFC 3645: Generic Security Service Algorithm for Secret Key Transaction Authentication for DNS (GSS-TSIG)," pp. 1-26, Oct. 2003.
C. Lynn et al., "RFC 3779: X.509 Extensions for IP Addresses and AS Identifiers," pp. 1-27, Jun. 2004.
T. Aura, "RFC 3972: Cryptographically Generated Addresses (CGA)," pp. 1-22, Mar. 2005.
R. Arends et al., "RFC 4034: Resource Records for the DNS Security Extensions," pp. 1-29, Mar. 2005.
R. Arends et al., "RFC 4033: DNS Security Introduction and Requirements," pp. 1-21, Mar. 2005.
J. Arkko et al., "RFC 3971: SEcure Neighbor Discovery (SEND)," pp. 1-56, Mar. 2005.
S. Weiler et al., "RFC 4470: Minimally Covering NSEC Records and DNSSEC On-line Signing," pp. 1-8, Apr. 2006.
T. Narten et al., "RFC 4861: Neighbor Discovery for IP version 6 (IPv6)," pp. 1-97, Sep. 2007.
CISCO White Paper, "IPv6 First Hop Security—Protecting Your IPv6 Access Network," pp. 1-6, 2010.
E. Levy-Abegnoli et al., "IPv6 Router Advertisement Guard," pp. 1-11, Sep. 2, 2010.
R. Gagliano et al., "Certificate profile and certificate management for Send," pp. 1-21, Nov. 24, 2010.
J. Jeong et al., "RFC 6106: IPv6 Router Advertisement Options for DNS Configuration," pp. 1-19, Nov. 2010.
E. Levy-Abegnoli et al., "RFC 6105: IPv6 Router Advertisement Guard," pp. 1-10, Feb. 2011.
T. Chown et al., "RFC 6104: Rogue IPv6 Router Advertisement Problem Statement," pp. 1-16, Feb. 2011.
T. Cheneau, M. Laurent, "Using Send Signature Algorithm Agility and Multiple-Key CGA to Secure Proxy Neighbor Discovery and Anycast Addressing", SAR-SSI 2011, *6th Conference on Network Architectures and Information Systems Security*, La Rochelle, France, 7 pages, May 18-21, 2011.
Microsoft TechNet, "How DNS Support for Active Directory Works," 13 pages, May 27, 2011.
"Domain Name System," Wikipedia, 12 pages, retrieved Jul. 19, 2011.
"Domain Name System Security Extensions," Wikipedia, 14 pages, retrieved Jul. 19, 2011.
"Name Server," Wikipedia, 3 pages, retrieved Jul. 19, 2011.
"TSIG," Wikipedia, 4 pages, retrieved Jul. 23, 2011.
O. Sury, "Securing the Last Hop," presentation given at the *81st IETF Meeting (IETF 81)*, Quebec City, Canada, retrieved from http://tools.ietf.org/agenda/81/slides/dane-3.pdf, 6 pages, Jul. 29, 2011.
DNS-based Authentication of Named Entities (DANE) Working Group, IETF, "IETF-81 dane agenda," retrieved from http://tools.ietf.org/wg/dane/agenda?item=agenda81.html, 2 pages, 2011.

\* cited by examiner

AUTHENTICATION OF CACHE DNS SERVER RESPONSES

FIELD OF THE INVENTION

The present application relates generally to computer networks, and particularly to security measures for protection of communication with domain name servers.

BACKGROUND

Identification for nodes on the Internet can take the form of a domain name, such as "cisco.com". Alternatively, nodes can be identified using an Internet Protocol (IP) addresses, such as "198.133.219.25" (IPv4) or 2001:db8:1756:5:d90:e6bf:fe35:46cf" (IPv6). The IP address is the form of identification that is actually used for enabling communication through standard Internet equipment. Thus, when a user or a computer program specifies an identifier in the form of a domain name, the identifier needs to be translated into an IP address before communication takes place. This translation is typically done with the assistance of a domain name system (DNS) server, also known as a name server. A DNS lookup request (also known as a DNS query, or DNS resolution request) is sent to the DNS server. The lookup request indicates the domain name that needs to be translated. The DNS server responds to the lookup request with a DNS lookup reply (also known as a DNS reply or DNS resolution) that includes responsive information for the lookup request. The responsive information can include the corresponding IP address for that domain name, or information on how to obtain that address from a different DNS server, or a "not found" notice, or an error message, or other information.

Although the domain name format requires this extra step of translation, it is widely used for several reasons. First, it is generally easier for users to remember a domain name than to remember the corresponding IP address. Second, an owner of the domain may wish to move the domain from one computer site to another. When such moves occur, the IP address of the domain generally changes but the domain name stays the same. Thus, customers and other users do not need to be apprised of the new IP address; it is sufficient for users to continue using the familiar domain name.

The correspondence between IP addresses and domain names is stored in DNS servers, which provide DNS lookup services. Rather than using a single point of reference, the Internet uses a variety of authoritative DNS servers as the defining sources of information regarding translation between domain names and IP addresses. Each authoritative DNS server is assigned responsibility for a set of domain names, and can sub-assign some responsibilities to other authoritative DNS servers.

In addition to the authoritative DNS servers, additional computers can also provide translation information between domain names and IP addresses. Such computers can operate a local (non-authoritative) DNS server to support their local environments, such as a corporate/enterprise environment, an Internet service provider's (ISP) customer base, or other groups of subscribers or users.

A local DNS server can obtain translation information from the authoritative servers, either directly or through other local DNS servers. The local DNS server's users or subscribers can query the local DNS server when a translation is needed. The deployment of local DNS servers allows for faster lookups and mitigates the load that would otherwise be placed on the authoritative DNS servers.

Communication between DNS servers and their users needs to be secure, to avoid cache poisoning, DNS redirects, spoofing, man-in-the-middle attacks, and other compromises of DNS replies that are sent to the users. Thus, ISPs and other corporate environments or enterprises may deploy their own local DNS servers that are directly accessible to their users. Such measures may partly mitigate the risk of interference by a malicious party. Nonetheless, it would be beneficial to have techniques for protecting this communication in a manner that supports detection of compromises.

BRIEF DESCRIPTION OF THE DRAWINGS

The present invention may be better understood, and its various objects, features, and advantages made apparent to those skilled in the art by referencing the accompanying drawings.

DETAILED DESCRIPTION OF THE PREFERRED EMBODIMENTS

One set of tools for protecting DNS lookup communications is the Domain Name System Security Extensions (DNSSEC). DNSSEC includes a set of specifications for securing some of the information conveyed in a DNS lookup reply. DNSSEC protects communication between authoritative DNS servers and local DNS servers. It generally does not, however, secure the communications between a local DNS server and end users.

Described herein are systems and methods that may be used in authenticating information received by a host such as an end user's computer, cell phone, or other Internet device from a local DNS server. In the context of data communication, authenticating a message is a process of confirming that the message came from a source that is ascribed in the message. Efficient authentication generally requires a number of supporting operations, including two operations that have been challenging in the context of DNS lookups by end users.

One of the supporting operations for authentication is the use of a cryptographic signature. A signature is typically generated by a sender of a message. The signature is a block of data appended to the message; the resulting combination is a signed message. A signature is created using a cryptographic signing protocol with at least two inputs: the message being signed (or at least the relevant contents of the message) and a cryptographic signing key of the sender.

A recipient of the signed message can test the signature using a signature-verification algorithm that complements the signing protocol. This verification generally uses at least three inputs: the received message, the received signature, and a certificate of the sender. The certificate is a block of data that is typically obtained by the recipient in advance of the communication of messages with the sender. The certificate may include (a) a name or other identifier of the sender, and (b) a cryptographic public key that is corresponds to the sender's signing key. With this information, a recipient of a signed message can check the signature of the signed message. That is, the recipient can use the signature-verification protocol to confirm that the signed message was actually signed by an entity that has the sender's signing key.

In other words, the signature-verification protocol helps the recipient of a signed message to confirm that the sender corresponds to a certificate that the recipient had previously received. This observation raises another security question: how does the recipient know that the previously-received certificate is trustworthy? A signature verification protocol can be used to confirm that the sender of a message is the same entity who originated the certificate. But it does not guarantee that that certificate actually originated from the person or entity identified in the certificate. Without more, it is possible that the certificate originated from a malicious party masquerading as the purported sender, opening the possibility of a man-in-the-middle attack or other security breaches. These concerns motivate a second supporting operation in the authentication process: key distribution.

Key distribution is a process of disseminating certificates that are known to be valid. If a user receives a sender's certificate through a trusted key distribution process, then the user can trust that the public key in the certificate actually corresponds to the party identified in the certificate. Key distribution generally requires a supporting infrastructure, such as a public key infrastructure (PKI) to which users can turn for verification of certificates.

Past efforts to protect end-to-end DNS lookup communications have faltered or been incomplete for a variety of reasons. Some past efforts have lacked an adequate cryptographic signature process. Other attempts required a cumbersome and impractical added infrastructure for key distribution.

Figure 1:
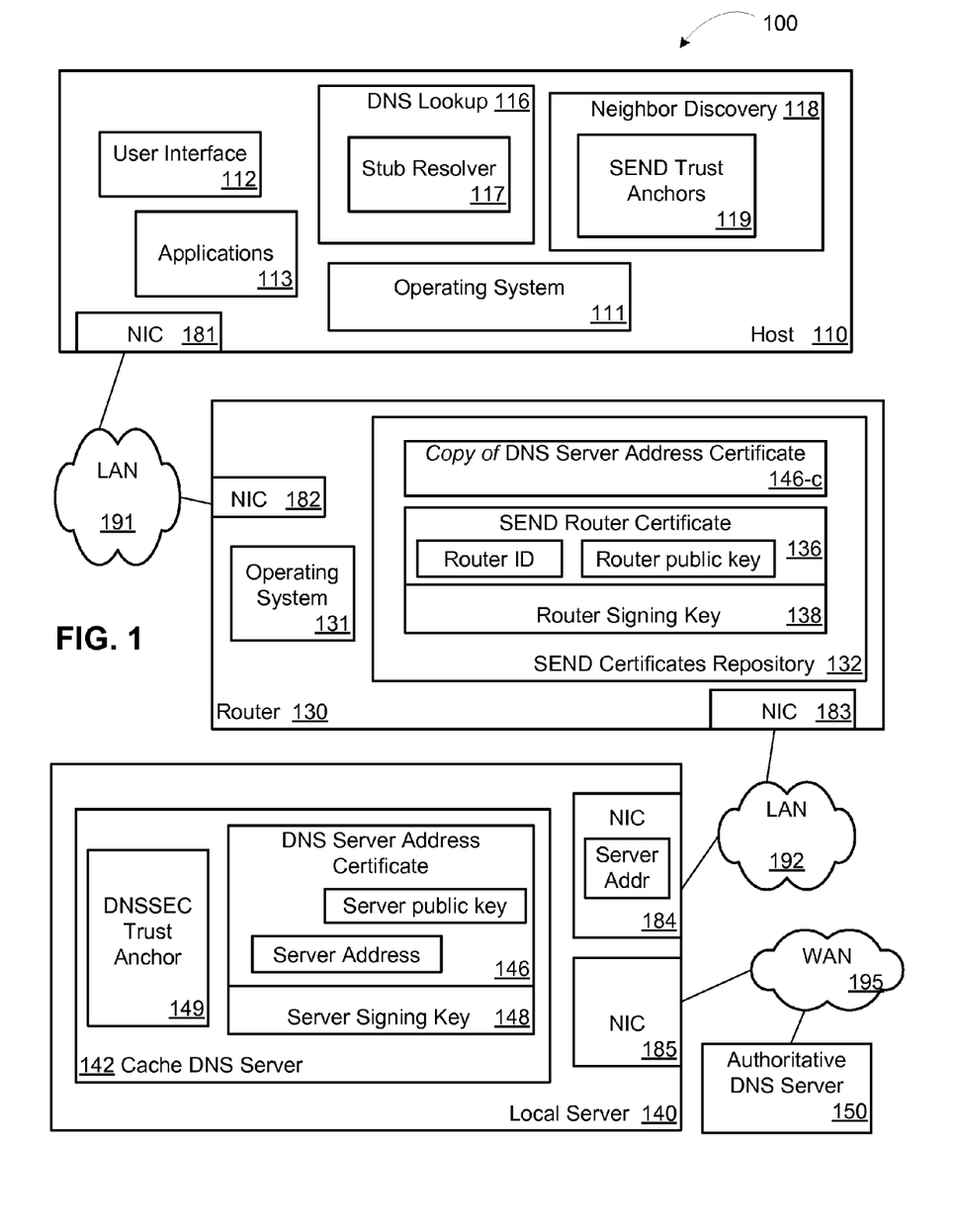
FIG. 1 depicts an example of an environment in which a host computer requests a DNS lookup.

FIG. 1 depicts an example of an environment 100 in which a host 110 requests a DNS lookup. In this example, the host is able to receive a verifiable response to the request. The environment includes one or more networks with various network nodes, such as host 110, a router 130, a local server 140, and an authoritative DNS server 150. In various implementations, host 110 is a desktop computer, a laptop computer, a mobile hotspot device, a mobile telephone, a smart phone, a blade server, a virtual machine, or other device or simulation or entity suitable for connecting to a computer network. Host 110 is communicatively coupled to router 130, for example via a local area network (LAN) 191. In turn, router 130 is communicatively coupled to local server 140 via another LAN 192. A wide area network (WAN) 195 is used for connectivity between local server 140 and authoritative DNS server 150.

Other configurations of environment 100 are also contemplated. In various implementations, LANs 191 and 192 are the same network as each other and/or as WAN 195. Router 130 can thus serve as an intermediate device or intermediate node between host 110 and local server 140. In alternate implementations, a router is deployed within a local server, or vice-versa. In yet other implementations, a router is deployed within a host, or vice-versa. In these configurations, various acts described below can be omitted or adapted accordingly.

Host 110 includes an operating system 111, a user interface 112, and various applications 113. Applications 113 and/or operating system 111 generally require communications with other devices. To this end, host 110 includes hardware for supporting such communication, such as a network interface card (NIC) 181 and associated software. The communication software, all or part of which may be deployed within an operating system or application, includes a neighbor discovery block 118 and a DNS lookup block 116, among others. In various situations, a device can include appropriate communications equipment in addition to, or instead of, a network interface card. For example, a host may be equipped with a communications interface that includes a network interface, a wireless communications circuit, an RF modulation block, a digital encoder, an antenna, and/or an optical communications module, among others.

Neighbor discovery block 118 is used by host 110 for initiating communications with neighboring devices in a network. In various implementations, neighbor discovery block 118 is used for discovering other devices on a link to which host 110 is connected, configuring an address (or addresses) of host 110, determining relationships between link layer addresses and network layer addresses, finding DNS servers that can be accessed through LAN 191, determining address prefixes and other configuration information, and determining when a neighbor is no longer reachable, among others.

In the example of FIG. 1, neighbor discovery block 118 includes a router discovery functionality that is used to find routers available to host 110 through LAN 191. The router discovery functionality uses cryptographically signed communications from candidate routers that present themselves to host 110. Neighbor discovery block 118 uses a set of trust anchors 119 as sources of verification for the candidate routers. Trust anchors 119 can include, for example, a list of public keys that are known by host 110 to correspond to trustworthy routers. Alternatively, or in addition, trust anchors 119 can include addresses of certificate authorities or other entities that can be trusted to confirm that a router is trustworthy, along with public keys of the certificate authorities or signatures/hashes of certificates deemed trustworthy. In various implementations of host 110, trust anchors 119 are installed by a system administrator. Alternatively, trust anchors 119 can be installed as part of an operating system or application.

In various implementations, neighbor discovery block 118 comports with the Secure Neighbor Discovery Protocol (SEND) extension of the Neighbor Discovery Protocol (NDP), which is used with Internet Protocol Version 6 (IPv6). In these implementations, trust anchors 119 include SEND trust anchors and engage a Resource Public Key Infrastructure (RPKI) for validation of the IP address of a router. Such trust anchors are deployed under the SEND protocol. In these and other implementations, trust anchors can be configured by a network administrator, shipped with a host, shipped with an operating system, shipped with one or more applications, or shipped with updates to an operating system or applications.

DNS lookup block 116 includes a stub resolver 117. Stub resolver 117 receives DNS lookup requests from applications 113 and/or operating system 111. A DNS lookup request indicates a domain name (or domain names) for which an IP address is needed. In response to a request, stub resolver 117 communicates the request to local server 140 and receives a DNS lookup reply with the requested address. Stub resolver 117 receives the replies from local server 140, and passes the requested IP address (or IP addresses) back to applications 113 and/or operating system 111. In various implementations, DNS lookup block 116 is installed as part of a DNS library in an operating system.

Router 130 includes an operating system 131, a network interface card (NIC) 182 and a certificates repository 132. NIC 182 enables communication by router 130 through LAN 191. In the depicted example, router 130 also includes an additional NIC 183 that enables communication by router 130 through LAN 192. In various environments, router 130 is operated by an internet service provider (ISP), cell phone data provider, or other enterprise for the benefit of the enterprise's customers or other users. In other environments, router 130 is a consumer device deployed at a user's residence.

Certificates repository 132 stores various certificates used for authenticating communications among host 110, router 130, and local server 140. Certificates repository 132 stores router signing key 138, which is a cryptographic private key of router 130. Certificates repository 132 also stores router certificate 136. This certificate includes an identifier of the router (router ID). Router certificate 136 also includes a router public key, which is a cryptographic public key that corresponds to router signing key 138. In various implementations, the router public key and router signing key 138 are generated by router 130, and router signing key 138 is used only by router 130; this signing key is never transmitted out of router 130. As a consequence of this practice, other entities can expect that any message signed with router signing key 138 has come from router 130. Certificates repository 132 also stores a certificate received from local server 140. This certificate is a copy 146-c of a DNS server address certificate 146 discussed below. In various environments, the DNS server address certificate is copied by an administrator for router 130 from local server 140 to router 130. Alternatively, DNS server address certificate can be transmitted during a preliminary communication from local server 140 to router 130 and/or authenticated using trust anchors (not shown) in router 130. In one implementation, DNS server address certificate 146-c is transmitted from local server 140 to router 130 in conjunction with a SEND interaction, and is authenticated using SEND trust anchors in router 130.

Local server 140 includes a network interface card (NIC) 184 and a cache DNS server 142. NIC 184 enables communication by local server 140 through LAN 192. NIC 184 is configured with a server address that is used to identify local server 140 to other devices on LAN 192. As discussed above, this address is recorded in DNS server address certificate 146. In the depicted example of FIG. 1, local server 140 also includes another network interface card 185 that enables communication by local server 140 through WAN 195. In various implementations, WAN 195 is the Internet. Local server 140 can communicate with authoritative DNS server 150 through WAN 195. In various environments, local server 140 is operated by an ISP, cell phone data provider, or other enterprise for the benefit of the enterprise's customers or other users. In addition to running cache DNS server 142, local server 140 can host other services (not shown), such as an email server, a web server, voicemail services, instant-messaging services, backup and archive services, among others. An administrator of local server 140 may configure, or assist with configuring, other devices in the enterprise (e.g., routers such as router 130).

Cache DNS server 142 is a local DNS server that provides a DNS lookup service. Like stub resolver 117, cache DNS server 142 responds to DNS lookup requests. However, in the example shown in FIG. 1, cache DNS server 142 stores DNS resolution information. Thus, cache DNS server 142 is capable of responding to at least some DNS queries without needing to pass the query on to other devices. The locally cached information is obtained, either directly or through other non-authoritative DNS servers, from authoritative DNS servers such as authoritative DNS server 150. Cache DNS server 142 temporarily stores DNS resolution information for each domain name for a period of time specified by authoritative servers for the domain name. The caching time for each DNS resolution record in cache DNS server 142 is specified by a "time to live" parameter that accompanies the record when it is received from authoritative DNS server 150. The local caching allows cache DNS server to respond to multiple identical DNS lookup requests without having to pass along the repeated requests to authoritative DNS server.

Cache DNS server 142 stores a server signing key 148 and a DNS server address certificate 146. Server signing key 148 is a cryptographic private key of the cache DNS server. DNS server address certificate 146 includes an identifier of the cache DNS server. In the example shown in FIG. 1, this identifier is the server address of local server 140. DNS server address certificate 146 also includes a server public key, which is a cryptographic public key that corresponds to server signing key 148. In various implementations, the server public key and server signing key 148 are generated by cache DNS server 142, and server signing key 148 is used only by cache DNS server 142; this signing key is never transmitted out of cache DNS server 142. As a consequence of this practice, other entities can expect that any message signed using server signing key 148 has come from cache DNS server 142.

DNS server address certificate 146 is communicated from cache DNS server 142 to router 130 before (or when) router 130 engages in a neighbor discovery operation with host 110. This communication allows router 130 to have a copy (146-c) of DNS server address certificate 146, as noted above. As discussed below, various embodiments of router 130 can transmit DNS server address certificate 146 to host 110 when router 130 engages in a neighbor discovery operation with host 110.

In the example depicted in FIG. 1, stub resolver 117 turns to cache DNS server 142 for assistance in responding to DNS lookup requests. This arrangement allows host 110 to offload the burden of DNS lookups to local server 140. Such an arrangement can be helpful in situations where multiple hosts are connected via reliable communications lines to a local server; the multiple hosts can then share the resources of a combined caching device. In other examples, a host can be configured with an internal DNS cache that works independently or with the support of a separate cache DNS server. Such arrangements may be suitable in situations such as mobile environments, where there is a notable cost to communications such as DNS lookup requests. Stub resolver 117 can preferably communicate with multiple other DNS servers (not shown) in addition to cache DNS server 140.

In various implementations, cache DNS server 142 is a full DNS server that includes the local caching capability and is also configurable to identify a full set of authoritative name servers and multiple name servers for a local domain. This redundancy allows cache DNS server to respond to all requests under normal operation, and also to resolve local DNS queries if a local network should experience a communication interruption from external networks.

Cache DNS server 142 also stores a trust anchor 149. This trust anchor is used to confirm identity and signature of the authoritative servers on which cache DNS server 142 may rely. Communication between cache DNS server 142 and authoritative DNS server 150 can then be authenticated in a cryptographic manner. A standard set of tools for this protection is the Domain Name System Security Extensions (DNS-SEC). In the example depicted in FIG. 1, trust anchor 149 is a DNSSEC trust anchor. DNSSEC relies on publicly known identities and security certificates that are available for authoritative servers (such as authoritative DNS server 150).

In contrast, no corresponding public key infrastructure has previously been established to similarly protect the non-authoritative DNS servers (such as cache DNS server 142), since they may be locally deployed as needed by private entities. Past efforts to secure DNS replies from such intermediate DNS servers to end users have generally fallen short, for example due to the lack of an appropriate infrastructure for public-key distribution, or due to the cost of implementing private/local infrastructures for public-key distribution. Other past efforts have relied on symmetric-key authentication, but have similarly required cumbersome deployment efforts for the distribution of large numbers of symmetric keys.

In the example of FIG. 1, DNS resolution responses from cache DNS server 142 to host 110 are protected by a communication that uses certificates, keys, and trust anchors such as elements 119, 136, 138, 146, 148, and/or 149 for authentication.

Figure 2:
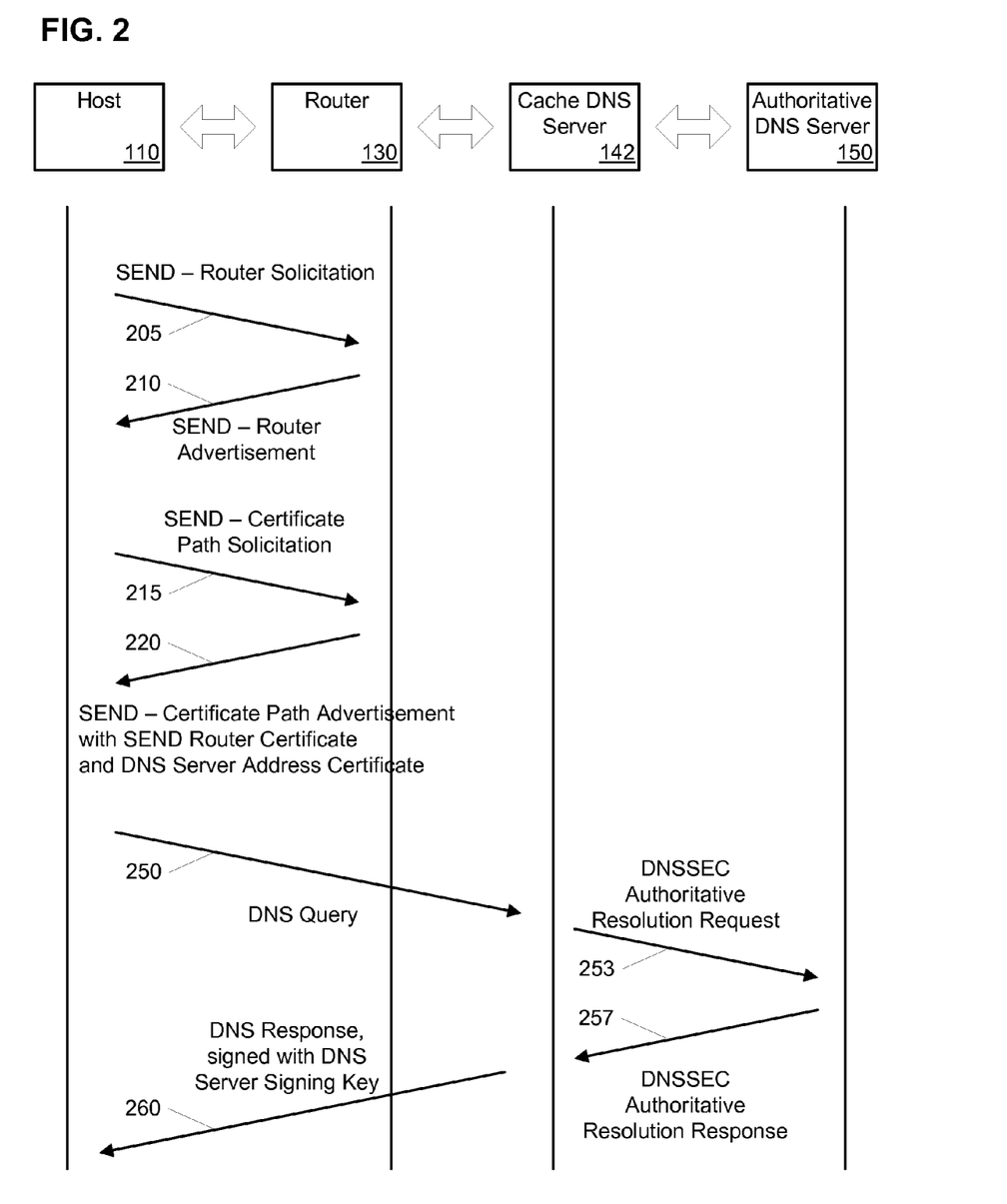
FIG. 2 depicts an example of a series of communications that used in support of a DNS lookup.

FIG. 2 depicts an example of a series of communications used in support of a secure DNS lookup. FIG. 2 depicts communications among four devices, a host, a router, a cache DNS server, and an authoritative DNS server. These elements are illustrated, in this example, by four of the elements from FIG. 1: host 110, router 130, cache DNS server 142, and authoritative DNS server 150. As noted above, the communication between cache DNS server 142 and authoritative DNS server 150 is protected by standard authentication provided by DNSSEC. In the examples of FIGS. 1 and 2, the corresponding communications from cache DNS server 142 to host 110 are protected using authentication supported by one or more certificates and/or keys that are conveyed at the time of a neighbor discovery process. In various implementations, the operations in FIG. 2 can be supported by modified implementations of the SEND extension in tandem with modified implementations of DNS communications.

FIG. 2 shows examples of an initial set of four messages 205, 210, 215, and 220 between a host and a router, and a pair of messages 250 and 260 between the host and a cache DNS server. This latter pair of messages may have an interposing pair of supporting messages 253 and 257 between the cache DNS server and an authoritative DNS server.

In message 205, the host 110 sends (e.g., multicast or broadcast) a router solicitation onto a local network (e.g., LAN 191 from FIG. 1). Message 205 can be return-addressed using an IPv6 link local address or a lower-level (e.g. data link layer) address such as a media access control address. The router solicitation is received by the router. The router responds with message 210, which communicates a router advertisement back to the host. In this message 210, the router states that this message originates from a router, acknowledges an address of the host and/or assigns an address to the host, and informs the host of the router's address. The router advertisement can include a router certificate such as router certificate 136 from FIG. 1.

The address of the host may be, for example, an IPv6 link local address. The address of the router may be an address that is based, in whole or in part, on a public key of the router as used for a neighbor-discovery process. In various implementations, an addressing system provides a cryptographic binding between a node and an IP address of the node, without the introduction of additional infrastructure. In various implementations, an address of a node may be based, at least in part, on a hash of a public key of the node. (E.g., host ID:=HASH62 [host public key].) The node may later sign outgoing messages with the signing key of the node. Under appropriate circumstances, the resulting signed messages self-prove that they originated from a node with that address. In one example, the address of the router is a cryptographically generated address (CGA) under the IPv6 protocol.

In various implementations, the router advertisement in message 210 includes a set of address prefixes that indicate whether or not the sending router can be reached by various hosts in a network. In various situations, the router may routinely transmit (e.g., multicast or broadcast) router advertisements on a regular basis. In such situations, the host may obtain the information in the router advertisement (e.g. message 210) without needing to send the initial router solicitation (e.g. message 205).

After obtaining the router advertisement, the host requests information with which it can confirm the trustworthiness of the router. This request is posed as a certificate path solicitation in message 215, sent from the host to the router. Message 215 includes one or more trust anchors, which indicate sources of information that are deemed trustworthy by the host. The router responds with message 220 back to the host. Like message 210, message 220 provides credentials of the router: message 220 includes a certificate path advertisement that connects the router to the host's trust anchor from message 215.

In one example, the certificate path advertisement in message 220 includes a series of certificates issued by different parties. Each of these certificates is issued by a vouching party for one or more vouched parties. In one form, a certificate includes identifiers of the vouched and vouching parties, a public key of the vouched party, and a signature made with a signing key of the vouching party. The series of certificates starts with a certificate for the router by a first vouching party. Each of the next certificates in the series is by another vouching party for the previous vouching party. The final certificate in the series is a certificate issued by a vouching party identified in the host's trust anchors. By checking the signatures of each certificate in this series, the host can authenticate the router. In various situations, the certificate path advertisement includes X.509 certificates issued by a series of nodes, and can accommodate the use of revocation lists.

In various implementations, one or more of messages 205, 210, 215, and 220 can be protected with one or more of cryptographic signatures such as Digital Signature Algorithm (DSA) signatures, signatures using the Rabin signature algorithm, RSA (Rivest-Shamir-Adleman) signatures, elliptic signatures, or others; message authentication codes such as HMAC-SHA256 or Poly1305-AES; key-based addresses such as CGA addresses; nonces; anti-replay timestamps; or other protective features.

In the example of FIG. 2, messages 205, 210, 215, and 220 are depicted as being based on the IPv6 SEND extension. In this example, message 205 is an IPv6 SEND router solicitation, message 210 is an IPv6 SEND router advertisement, message 215 is an IPv6 SEND certificate path solicitation, and message 220 is a modified IPv6 SEND certificate path advertisement. In these implementations, the host's trust anchors (e.g., trust anchors 119 from FIG. 1) are SEND trust anchors deployed under the SEND protocol.

In various implementations of a system, the host can be adapted to inform the router that the host is capable of using a DNS server address certificate. Similarly, the host may be configured to seek a router (or DNS server) that can provide a DNS server address certificate. In various situations, the host may be configured to operate only with routers (or DNS servers) that can provide a DNS server address certificate as part of an adapted SEND interaction. In various implementations, certificate information can be included in an Extended Key Usage (EKU) field of a SEND message.

Various documents describe the DNS and SEND protocols and addressing conventions, for example memoranda published by the Internet Engineering Task Force (IETF) as Requests for Comments (RFC). Examples include RFC 2136, RFC 2137, RFC 2461, RFC 2535, RFC 2845, RFC 2930, RFC 2931, RFC 3007, RFC 3645, RFC 3779, RFC 3971, RFC 3972, RFC 4033, RFC 4034, RFC 4470, RFC 4861, RFC 6104, RFC 6105, and RFC 6106, each of which is hereby incorporated by reference.

In the example of FIG. 2, the router also provides the host with a DNS server address certificate. This certificate was previously obtained by the router from the cache DNS server, and can be conveyed from the router to the host within or along with the certificate path advertisement in message 220. In various implementations of the procedure shown in FIG. 2, the host authenticates the cache DNS server certificate based on having received the certificate via a trusted router. Alternatively or in addition, the host can authenticate the cache DNS server certificate using communications similar to those by which the host authenticated the router (e.g., messages 205, 210, 215, 220), with certificate path solicitation and certificate path advertisement messages and a trust anchor (e.g., trust anchors 119) and using the SEND validation algorithm.

In yet other implementations, the cache DNS server can be deployed within the router. (For example, router 130 in FIG. 1 can be adapted to include cache DNS server 142.) In these implementations, an authentication of the cache DNS server can be obviated once the router has been authenticated.

In various implementations, the DNS server address certificate sent in message 220 can be certificate 146-*c* shown in FIG. 1. The DNS server address certificate is used to configure the host for interaction with the cache DNS server.

In the example of FIG. 2, the DNS server address certificate includes an address of the cache DNS server and a public key of the cache DNS server. In various implementations, the DNS server address certificate is signed by the cache DNS server and by one or more additionally entities that are parties trusted by the host. The host can, in some implementations, authenticate the DNS server address certificate based on trust anchors (e.g., trust anchors 119 from FIG. 1) and/or based on a signatures advertised by router 130 to the host.

Having possession of the DNS server address certificate, the host can use this certificate to authenticate DNS responses from cache DNS server 142. After authenticating the router and the DNS server address certificate, the host can accept the configuration information received in messages 210, 220, and can initiate DNS requests and other communications. In message 250, the host transmits a DNS lookup request to cache DNS server. The DNS lookup request specifies a domain name (e.g. "anishtongerbauner.com.") or sub-domain name (e.g. "buyerpage.anishtongerbauner.com") for which an IP address is needed. The cache DNS server checks its cached records to determine whether or not it includes a record for this name. If the cache DNS server has a record for this name, the cache DNS server uses that record to generate a reply to the host. Otherwise, the cache DNS server sends a lookup request 253 with this name to another DNS server, such as authoritative DNS server 150. When the cache DNS server receives a reply 257 (either with responsive information or with a request failure), the reply is authenticated with the DNSSEC protocol. The cache DNS server then uses reply 257 to respond to the host's query from message 250.

In message 260, the cache DNS server responds to the host with a DNS lookup reply that includes the IP address or other responsive information for the domain name specified in message 250. For example, the reply may include an address in IPv6 form, such as "2001:db8:1756:5:d90:e6bf:fe35:46cf". The reply may include information from a DNS resource record for the name, such as an expiration time limit for the record (time-to-live parameter), a type of the resource record (e.g., an A record that translates from a domain name to an IPv4 address, an AAAA record that translates from a domain name to an IPv6 address, a CNAME record that specifies another domain name for which the requested domain name is an alias, an NS record that lists name servers that can answer lookups on a DNS zone, an MX record that specifies a mail server used to handle mail for the domain name, among others), and a class of the resource record, among others. Message 260 may additionally, or alternatively, include a requested domain name, since some addressing systems (e.g., IPv6) supports the reverse mapping of IP addresses to domain names. If appropriate, the reply may alternatively indicate that an IP address is not available for the requested address.

Message 260 includes a signature by the cache DNS server. The signature is generated using a signing key of the server, such as server signing key 148 from FIG. 1. The signature applies to information conveyed in message 260, such as the responsive IP address or other responsive information or a responsive error message.

After the host receives message 260, the host can authenticate the message using the signature therein and the DNS server address certificate, which includes a public key that corresponds to the server signing key (and which was previously received in message 220.) If the authentication shows the host that message 220 is not properly signed, host 220 can discard the message. In that case, host 220 may take additional protective security steps, such as starting a count of non-authentic responses and alerting a system administrator if the count exceeds some threshold or blocking/blacklisting this particular cache DNS server. If the authentication shows the host that message 220 is properly signed, host 220 can proceed to use the IP address indicated in that message for communication.

Figure 3:
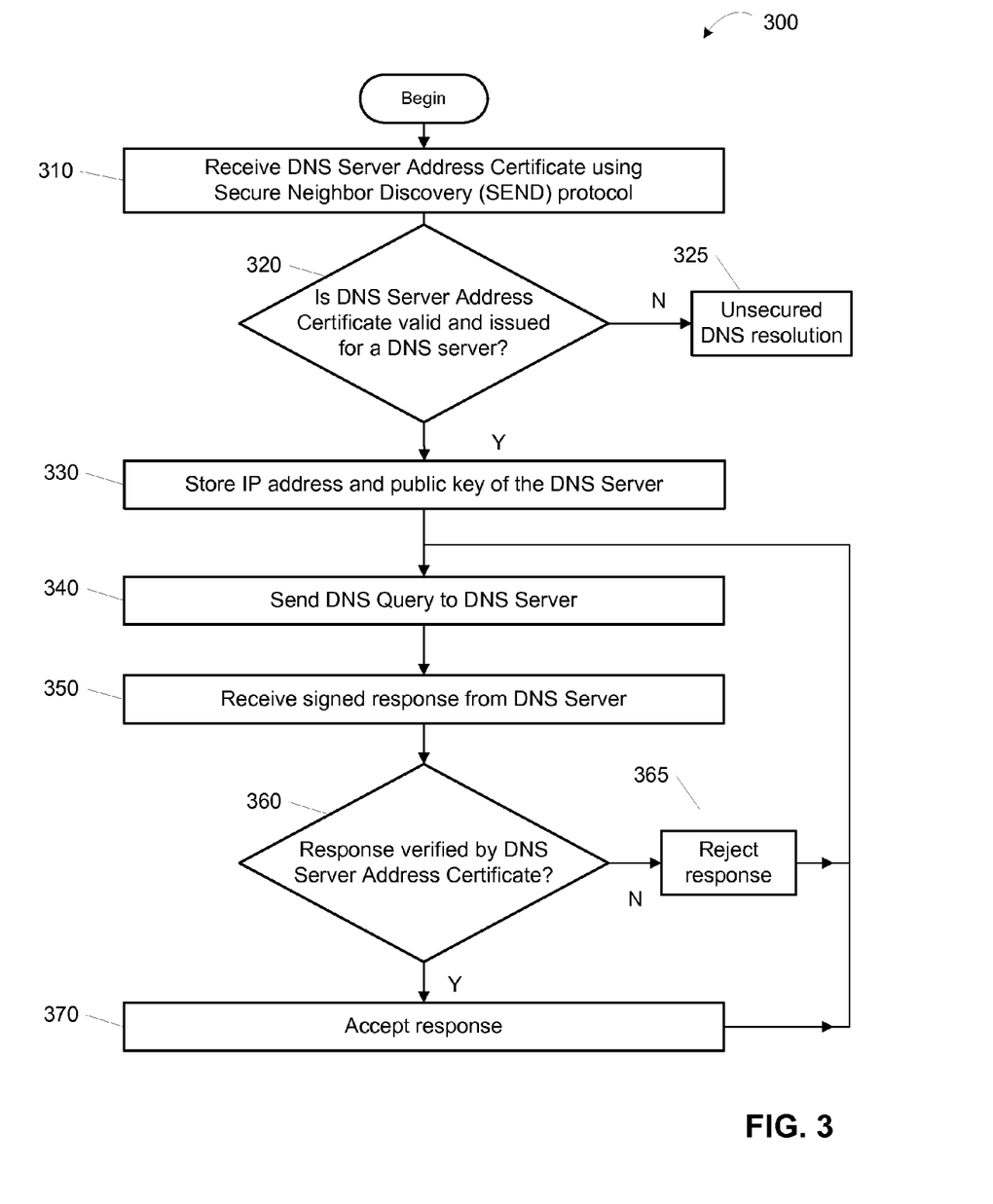
FIG. 3 is a flow chart showing acts occurring in one an example of a method for DNS lookup.

FIG. 3 is a flow chart showing acts occurring in one an example of a method 300 for DNS lookup. In one example, host 110 from FIG. 1 can execute the acts shown in method 300. The method begins in block 310 with the reception of a DNS server address certificate from a DNS server. For example, host 110 from FIG. 1 can receive a copy of DNS server address certificate 146 from cache DNS server 142 via router 130. The DNS server address certificate can be received as part of a modified neighbor discovery procedure.

In block 320, the DNS server address certificate is examined for authenticity. In various implementations, the neighbor discovery protocol can allow for the use of trust anchors to authenticate the DNS server address certificate. This examination determines whether the DNS server address certificate is valid and whether the DNS server address certificate has been issued by a trustworthy DNS server. If the DNS server address certificate fails this examination it is can be discarded. Alternatively, method 300 can proceed to rely on the DNS server, using unsecured DNS resolution in block 325.

If the DNS server address certificate passes the examination from block 320, then in block 330 contents from the DNS server address certificate are stored for use in DNS lookup operations. The contents include an address of the DNS server that originated the certificate, and a public key of that server.

In block 340, method 300 then begins a DNS lookup process that includes an authentication based on the DNS server address certificate that was received in block 310 (e.g., as part of the SEND protocol or other protocol using existing trust anchors or PKI deployment). In block 340, a DNS lookup query is sent to the DNS server at the address that was stored at block 330. In block 350, a response is received. The response indicates that it is responsive to the query from block 340. For example, the response may include information that reiterates the query, such as a domain name, a time stamp, an identifier of the query sender, among others. The response includes responsive information, such as the requested IP address corresponding to a domain name in the request from block 340. The response also includes a signature by the DNS server. In various implementations, the signature is generated by the DNS server using elements of the SIG(0) and TSIG protocols described, for example, in RFC 2535, RFC 2931, and RFC 2845, noted above.

In block 360, the response is examined to determine whether the signature is valid. This examination uses the public key that was stored at block 330. If the signature examination shows that the message is properly signed (proving that it was signed by an entity who has a signing key that corresponds to the public key stored at block 330), then the response is accepted in block 370 as an authenticated response with trustworthy information, and the IP address (or other information) therein can be used for further communication. Otherwise, the response is discarded in block 365 if it fails the examination from block 360.

Figure 4:
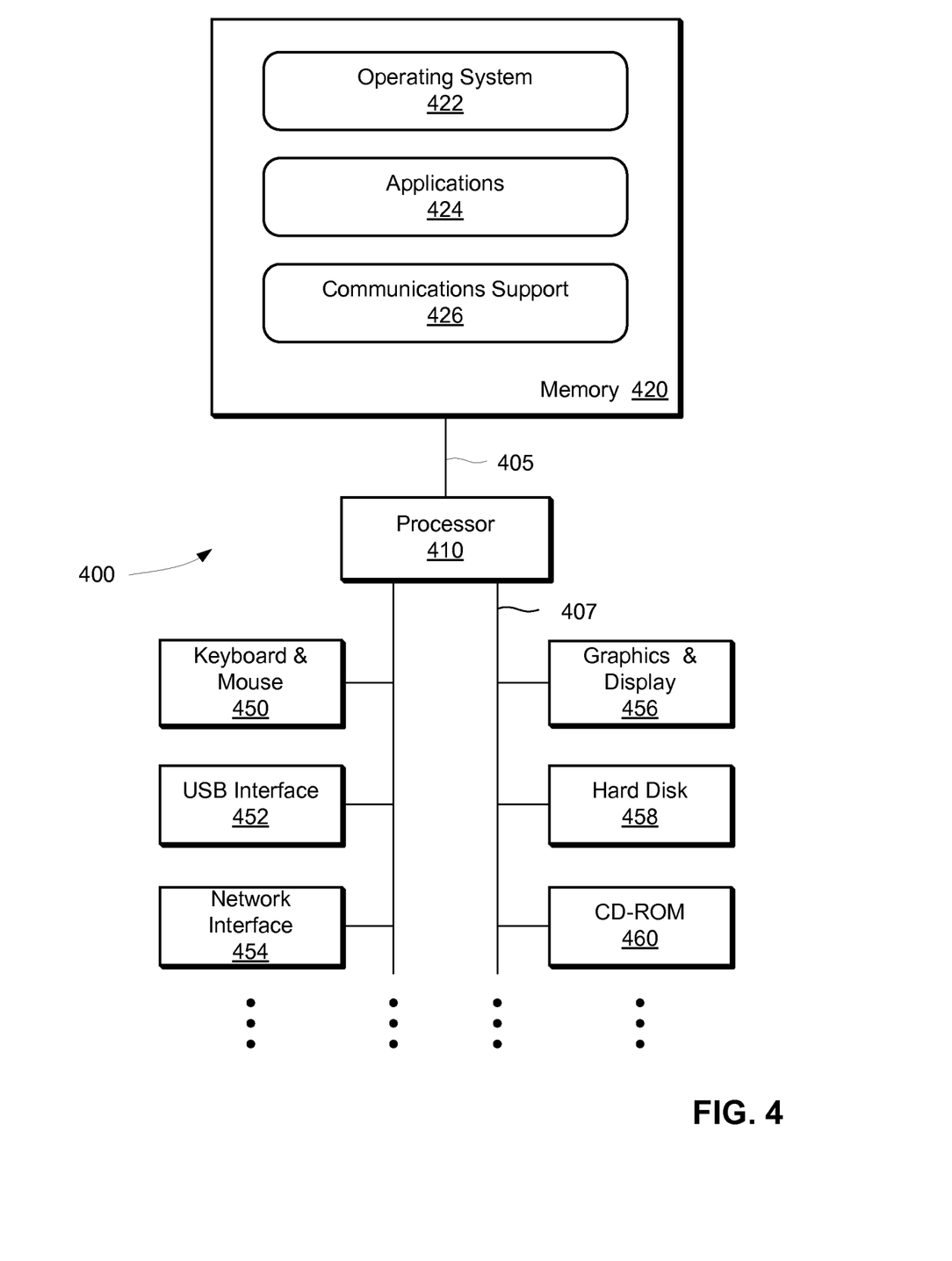
FIG. 4 is a block diagram of an example of a computer system that can be used to implement one or more of the techniques described herein.

FIG. 4 is a block diagram of one implementation of a computer system 400 that can be used for one or more of the techniques described herein. For example, the computer system 400, or portions thereof, can be used to implement a system (e.g., host 110, router 130, or local server 140) that runs applications and/or operating systems for authenticating DNS resolution responses and/or other communications processes. Computer system 400 can include one or more processors 410 and memories 420 coupled together by a communications bus 405. Processor 410 can be a single processor or a number of individual processors working together. It is also contemplated that processor 410 can be one or more virtual processors. Memory 420 can be a random access memory (RAM) or some other dynamic storage device and can be capable of storing instructions to be executed by the processor, e.g., an operating system 422 and applications 424, as well as communications support data 426. Operating system 422 can include software for managing network communications, implementing a file system, managing user preferences, or combinations thereof, among others. Applications 424 can include browsers, email clients, email servers, database applications, email servers, data-mover applications, virtual-machine mounting software, volume management software, mobile communications applications, personal organizer applications, computational applications, accounting software, remote archiving software, network applications, cloud servers, clients for clouds services, API modules, volume replicators, encryption software, hashing software, authentication software, DNS resolution software, neighbor discovery software, or combinations thereof, among others. Examples of operating systems include Cisco IOS®, Linux®, FreeBSD®, Windows®, Mac OS®, Android™, among others. Memory 420 can be augmented to include auxiliary storage such as a Single Inline Memory Module (SIMM) card, a flash memory, and/or a hard disk, and can also be used for storing temporary variables or other intermediate information during the execution of instructions by the processor 410.

Computer system 400 can also include devices such as a keyboard and mouse 450, other human-interface input devices, a USB interface 452, one or more network interfaces 454 supporting wired and/or wireless communications, a graphics module and display 456, other human-interface output devices, a hard disk 458, and a CD-ROM 460, all of which are coupled to processor 410 by a communications bus 407. It will be apparent to those having ordinary skill in the art that computer system 400 can also include numerous elements not shown in the figure, such as additional storage devices, communications devices, input devices and output devices, as illustrated by the ellipses shown.

FIGS. 1-4 illustrate some of the many operational examples of the techniques of the present invention. Those having ordinary skill in the art will readily recognize that certain steps or operations described herein can be eliminated or taken in an alternate order. Moreover, various operations discussed with respect to FIGS. 1-4 can be implemented as one or more software programs for a computer system and encoded in a computer readable medium. For example, software 422 or 424 can be stored as source code (e.g., in languages such as assembly language, Pascal, and C; object oriented languages such as C++, C#, and Java; and scripting languages such as Perl, Python, or Ruby) or compiled instructions executable on one or more processors. The computer readable medium can include a solid-state storage medium, a magnetic storage medium (e.g., hard disk 458), or an optical storage medium (e.g., CD-ROM 460), or combinations thereof. Separate instances of these programs may be executed on separate computer systems. Thus, although certain steps have been described as being performed by certain devices, software programs, processes, or entities, this need not be the case and a variety of alternative implementations will be understood by those having ordinary skill in the art. Additionally, those having ordinary skill in the art will readily recognize that the techniques described above can be utilized with a variety of different storage devices and computing systems with variations in, for example, the number of processors, host systems, storage systems, or applications, among others.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, at a network node, a Domain Name System (DNS) server address certificate, wherein
      the DNS server address certificate is received from a cache DNS server, and
      the receiving the DNS server address certificate is a portion of a DNS server authentication process between the network node and the cache DNS server;
   receiving, at the network node, a request from a host after the network node receives the DNS server address certificate, wherein
      the request initiates a router authentication process; and
   performing the router authentication process, in response to the request,
      wherein
      the router authentication process comprises transmitting a reply to the host,
      the reply comprises authentication information,
      the authentication information comprises a plurality of certificates,
      the plurality of certificates comprises the DNS server address certificate,
      the DNS server address certificate comprises an identifier of the cache DNS server and a public key of the cache DNS server.

2. The method of claim 1, wherein the host is configured to authenticate a DNS resolution using the public key of the cache DNS server.

3. The method of claim 1, wherein:
   the network node comprises a router;
   the host is coupled to the router via a data network;

the identifier of the cache DNS server comprises an address of the cache DNS server; and the request and the reply are communications in a neighbor discovery protocol.

4. The method of claim 1, wherein the request and the reply are communications in a Secure Neighbor Discovery Protocol (SEND) interaction.

5. The method of claim 4, wherein:
the request is comprised in a SEND certificate path solicitation; and
the reply is comprised in a SEND certificate path advertisement.

6. The method of claim 1, comprising:
receiving the public key of the cache DNS server from the cache DNS server; and
prior to transmitting the reply, authenticating the public key of the cache DNS server based at least in part on a trust anchor stored in the network node.

7. The method of claim 1, comprising:
communicating a DNS query from the host to the cache DNS server; and
communicating a DNS resolution from the cache DNS server to the host, wherein
the DNS resolution is signed by a private key that corresponds to the public key.

8. The method of claim 7 wherein the DNS query comprises a name identifier and the DNS resolution comprises resolution information that is responsive to the DNS query, the method comprising:
communicating the name identifier from the cache DNS server to an authoritative DNS server;
communicating the resolution information from the authoritative DNS server to the cache DNS server; and
authenticating the resolution information using a Domain Name System Security Protocol (DNSSEC) authentication process.

9. The method of claim 1 wherein the request comprises a plurality of trust anchors.

10. The method of claim 1 wherein the plurality of certificates comprises a plurality of signatures, wherein the plurality of signatures can be used by the host to authenticate the network node.

11. A system comprising:
a communications interface; a memory; and
a processor configured, based at least in part on instructions stored in the memory,
to receive a Domain Name System (DNS) server address certificate,
wherein
the DNS server address certificate is received from a cache DNS server,
receiving the DNS address certificate is a portion of a DNS server authentication process between a network node and the cache DNS server;
store the DNS server address certificate in memory,
receive a request from a host after receiving the DNS server address certificate, wherein
the request initiates a router authentication process; and
perform the router authentication process, in response to the request,
wherein
the router authentication process comprises transmitting a reply comprising authentication information to the host,
the authentication information comprises a plurality of certificates,
the plurality of certificates comprises the DNS server address certificate, and
the DNS server address certificate comprises an identifier of the cache DNS server and a public key of the cache DNS server.

12. The system of claim 11, wherein the host is configured to authenticate a DNS resolution using the public key of the cache DNS server.

13. The system of claim 11, wherein:
the host and the communications interface are each coupled to a data network;
the cache DNS server is a non-authoritative DNS server; and
the address of the cache DNS server comprises a hash of the public key of the cache DNS server.

14. The system of claim 11, wherein the request and the reply are communications in a Secure Neighbor Discovery Protocol (SEND) interaction.

15. The system of claim 14, wherein:
a trust anchor is received in a SEND certificate path solicitation; and
the public key of the cache DNS server is transmitted in a SEND certificate path advertisement.

16. The system of claim 11, wherein the processor is configured to:
receive the public key of the cache DNS server from the cache DNS server; and
authenticate the public key of the cache DNS server based at least in part on a trust anchor stored in the memory.

17. The system of claim 11, wherein the processor is configured to:
convey a DNS query from the host to the cache DNS server; and
convey a DNS resolution from the cache DNS server to the host, wherein the DNS resolution is signed by a private key that corresponds to the public key.

18. The system of claim 17 wherein the DNS query comprises a domain name, the DNS resolution comprises an IP address, and the cache DNS server is configured to:
communicate the domain name to an authoritative DNS server; and
authenticate a reply from the authoritative DNS server using a Domain Name System Security (DNSSEC) authentication.

19. A non-transient computer-readable medium having instructions encoded therein, wherein the instructions are executable by one or more processors to perform acts comprising:
receiving, at a network node, a Domain Name System (DNS) server address certificate, wherein
the DNS server address certificate is received from a cache DNS server,
receiving the DNS address certificate comprises a portion of a DNS server authentication process between the network node and the cache DNS server;
storing the DNS server address certificate in memory;
receiving, at the network node, a request from a host, wherein
the request initiates a router authentication process; and
performing the router authentication process, in response to the request,
wherein
the router authentication process comprises transmitting a reply to the host,
the reply comprises authentication information,
the authentication information comprises a plurality of certificates, the plurality of certificates comprises the DNS server address certificate, and the DNS server address certificate comprises an identifier of the cache DNS server and a public key of the cache DNS server.

* * * * *